United States Patent [19]

Chan

[11] Patent Number: 4,742,225
[45] Date of Patent: May 3, 1988

[54] ELLIPTICAL CYLINDER LIGHT COLLECTOR FOR PHOTOSIMULABLE PHOSPHOR IMAGING APPARATUS

[75] Inventor: Yali E. Chan, Rochester, N.Y.

[73] Assignee: Eastman Kodak Company, Rochester, N.Y.

[21] Appl. No.: 919,357

[22] Filed: Oct. 16, 1986

[51] Int. Cl.$^4$ .............................................. G03C 5/16
[52] U.S. Cl. .............................. 250/327.2; 250/484.1
[58] Field of Search ................... 250/327.2, 484.1, 353

[56] References Cited

U.S. PATENT DOCUMENTS

| | | | |
|---|---|---|---|
| Re. 31,847 | 3/1985 | Luckey | 250/327.2 |
| 1,897,219 | 2/1933 | Schröter | 250/228 |
| 3,674,974 | 7/1972 | Costello | 350/618 |
| 3,893,079 | 7/1975 | Shepard et al. | |
| 4,003,638 | 1/1977 | Winston | 350/293 |
| 4,041,454 | 8/1977 | Shepard et al. | |
| 4,321,630 | 3/1982 | Kramer | 250/228 |
| 4,346,295 | 8/1982 | Tanaka et al. | 250/327.2 |
| 4,453,180 | 6/1984 | Juergensen | 250/228 |
| 4,568,984 | 2/1986 | Juergensen et al. | 250/574 |
| 4,582,988 | 4/1986 | Aagano | 250/327.2 |
| 4,591,714 | 5/1986 | Goto et al. | 250/327.2 |
| 4,616,129 | 10/1986 | Yamada et al. | 250/327.2 |

FOREIGN PATENT DOCUMENTS 0137674 8/1984 European Pat. Off.
0142833 11/1984 European Pat. Off.

*Primary Examiner*—Carolyn E. Fields
*Attorney, Agent, or Firm*—Thomas H. Close

[57] ABSTRACT

A light collector for collecting and detecting emitted light from a stimulable phosphor sheet includes a cylinder with an elliptical cross section having specularly reflective internal surfaces, a pair of plane mirrors at the ends of the cylinder, and a row of photodetectors located along one side of the cylinder in the vicinity of a focal line of the ellipse. The stimulable phosphor sheet is positioned in the vicinity of the other focal line of the ellipse, so that most the light emitted from the stimulable phosphor is reflected once from the elliptical reflector to the light detector.

7 Claims, 2 Drawing Sheets

ELLIPTICAL CYLINDER LIGHT COLLECTOR FOR PHOTOSIMULABLE PHOSPHOR IMAGING APPARATUS

TECHNICAL FIELD

The invention relates to apparatus for reading out the image stored in a photostimulable phosphor image recording medium, and more particularly to apparatus for collecting and detecting the radiation emitted from the photostimulable phosphor in response to interrogation by stimulating radiation.

BACKGROUND ART

In a photostimulable phosphor imaging system, as described in U.S. Pat. No. Re. 31,847 reissued Mar. 12, 1985 to Luckey, a photostimulable phosphor sheet is exposed to an imagewise pattern of short wavelength radition, such as x-radiation, to record a latent image pattern in the photostimulable phosphor sheet. The latent image is read out by stimulating the phosphor with a relatively long wavelength stimulating radiation such as red or infrared light. Upon stimulation, the photostimulable phosphor releases emitted radiation of an intermediate wavelength such as blue or violet light in proportion to the quantity of short wavelength radiation that was received. To produce a signal useful in electronic image processing, the photostimulable phosphor sheet is scanned in a raster pattern by a beam of light produced for example by a laser deflected by an oscillating or rotating scanning mirror and the emitted radition is sensed by a photodetector such as a photomultiplier tube to produce the electronic image signal.

In one type of scanning apparatus, the photostimulable phosphor sheet is placed on a translation stage and is translated in a page scan direction past a laser beam that is repeatedly deflected in a line scan direction to form the scanning raster.

To optimize the signal-to-noise ratio (S/N) of the imaging system, it is desirable to collect as much of the emitted light as possible and to direct it to the photodetector. While the apparatus employed to collect the light may take various forms, one form of light collector is proposed in U.S. Pat. No. 4,346,295, issued Aug. 24, 1982, to Tanaka et al. The light collector proposed by Tanaka et al comprises a sheet of light transmitting material that is flat on one end, and rolled into an annular shape on the opposite end. The flat end of the light collector is positioned adjacent the scan line on the photostimulable phosphor sheet. The light receiving face of a photomultiplier tube is placed against the annular end of the light collector.

Light emitted from the phosphor sheet enters the flat end of the light collector and is light piped to the photomultiplier tube. Improved light collection efficiencies are achieved by having two such light collectors, one on each side of the scan line, or by placing a long narrow reflector opposite the flat end of the light collector to increase the collection window of the light collector. The transparent light collector has the drawback that it is inherently complicated to manufacture. Furthermore, the collection efficiency of transparent light guides is limited due to their absorption in the wavelenth range of light emitted by the photostimulable phosphor sheet (e.g. blue-violet).

Experiments have identified another factor that limits the signal-to-noise ratio achievable with the photostimulable phosphor imaging apparatus. As the photostimulable phosphor sheet is scanned by the stimulating radiation beam, a high percentage (up to 90%) of the stimulating radiation is reflected from the photostimulable phosphor. If this reflected stimulating radiation is further reflected back on to the surface of the photostimulable phosphor (it is then called "flare") in a location away from the instantaneous scanning point, the phosphor will be stimulated to emit in these other locations. When this flare induced emission of light is collected by the light collector it is called prestimulation and results in a spurious background signal. Such reflection of the stimulating radiation onto the photostimulable phosphor may occur from the light collecting edge of the light guide described above. Examples of the image degradation caused by prestimulation include a reduction in the contrast of images due to flare induced emission from high exposure areas. This adds unwanted signal to low exposure areas. Shadow artifacts are produced in the image when a high exposure object on a low exposure background field is scanned. The signal-to-noise ratio in all image areas is degraded. Laser noise is enhanced since a large area of the phosphor is exposed to a low level of stimulating radiation, the light emitted from this area will follow the fluctuations in laser power, thereby amplifying the effect of the laser noise.

It is therefore the object of the present invention to provide a light collector having improved collection efficiency and one that is easy to manufacture. It is a further object of the present invention to provide an improved light collector having reduced flare. A desirable feature of such a light collector is that the collection efficiency versus scan position across a scan line be uniform. It is therefore a further object of the present invention to provide a light collector having a uniform collection efficiency across a scan line.

DISCLOSURE OF THE INVENTION

The objects of the present invention are achieved by providing a light collector having a cylindrical mirror box with specularly reflective internal surfaces. The mirror box defines a first opening for passing a beam of stimulating radiation through the mirror box, a second opening for passing the beam to a phosphor sheet, and for allowing emitted light from the phosphor sheet to enter the light box, and a third opening generally opposite the second opening for allowing emitted light to exit the light box. A row of light detectors having light receiving faces are located at the third opening. The cylindrical mirror box has a elliptical cross section. The second and third openings are defined by first and second planes parallel to the cylinder axis and generally perpendicular to the major elliptical axis and passing in the vicinity of the first and second focal lines of the ellipse such that light emitted from the phosphor sheet in the vicinity of the first focal line impinges on the light receiving face of a detector in the vicinity of the second focal line after experiencing a single reflection from the elliptical sides of the mirror box.

MODES OF CARRYING OUT THE INVENTION

Figure 1:
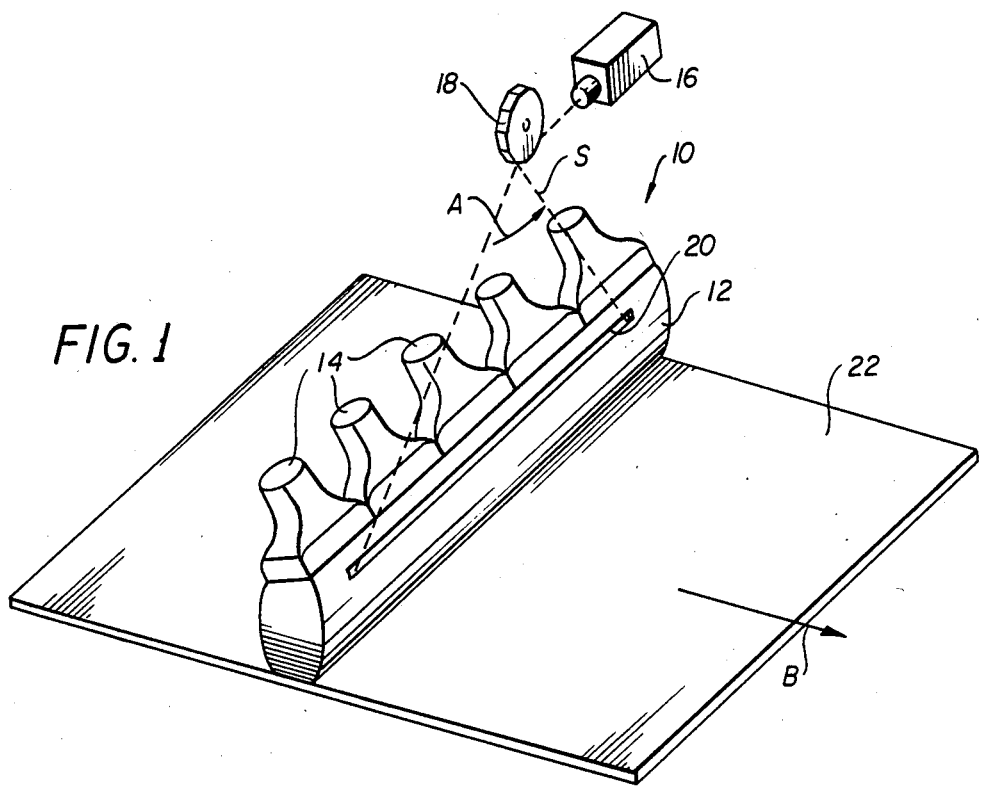
FIG. 1 is a perspective view of a light collector according to the present invention.

Turning now to FIG. 1, there is shown a light collector, generally designated 10, according to the present invention. The light collector 10 includes a mirror box 12 having an elliptical cross section and having a specularly reflective internal surface, and a row of rectangular faced photomultiplier tubes 14.

A beam of stimulating radiation S from a laser 16 is deflected in a line scan direction A by a spinning polygon mirror 18. The beam S passes through the mirror box 12 through a slot 20 and an opening on the bottom of a mirror box 12 (not shown in FIG. 1) to impinge upon a stimulable phosphor sheet 22. The phosphor sheet 22 is moved in the direction of arrow B to provide a raster scan.

Light emitted by the phosphor sheet enters the mirror box 12 through the bottom opening and exits through a top opening to illuminate the light receiving faces of the row of rectangular faced photomultiplier tubes 14.

Figure 2:
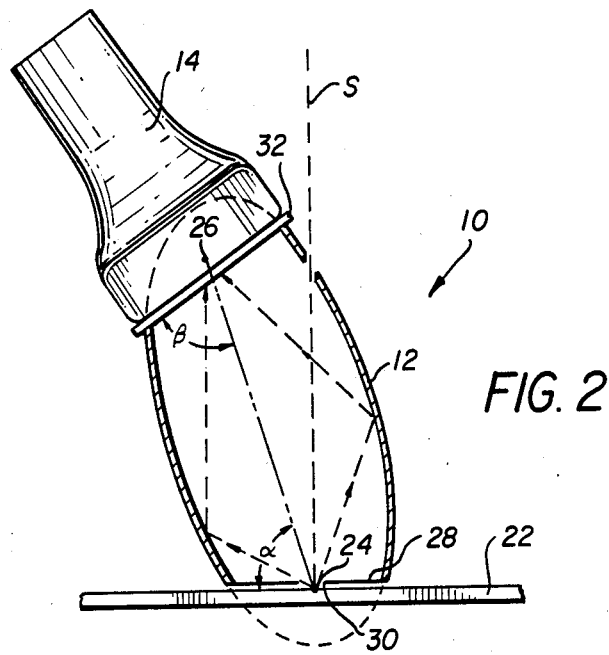
FIG. 2 is an end view of the light collector shown in FIG. 1.

FIG. 2 shows a side view of the light collector, where the elliptical outline of the mirror box 12 is continued in phantom to better illustrate the shape of the ellipse. As shown in FIG. 2, the major axis of the ellipse is tilted with respect to the surface of the phosphor sheet 22 by an angle $\alpha$ of about 70°. The ellipse is truncated by a first plane parallel to the cylinder axis and to the surface of the phosphor sheet 22 and passing in the vicinity of a first focal line of the elliptical cylinder (shown end-on as point 24 in FIG. 2) to form the bottom opening through which stimulating light S reaches the phosphor sheet, and emitted light enters the mirror box. The elliptical cylinder is also truncated by a second plane parallel to the cylinder axis and passing in the vicinity of the second focal line of the elliptical cylinder (shown end-on as point 26 in FIG. 2) to form the top opening. The plane defining the top opening is tilted at an angle $\beta$ of about 76° from the major axis of the ellipse. The angle 76° was chosen to minimize the chance that light reflected from the face of the light detector will reach the surface of the phosphor sheet, while optimizing light collection efficiency of the collector.

Light emitted at the scan line on the phosphor sheet is reflected once from the elliptical sides of the mirror box 12 and falls on the light receiving face of the photomultiplier tube 14. Exemplary rays of emitted light are shown by dashed lines in FIG. 2.

Preferably, to reduce flare, a mask 28 is provided over the bottom opening in the mirror box. The mask defines a slot 30 to allow the stimulating light to pass, and the emitted light to enter the mirror box. The mask 28 is covered with a light absorbing material, such as black paint to further reduce flare. A filter 32 is positioned over the light receiving face of the photomultiplier tube 14. The filter 32 absorbs stimulating light and passes emitted light to the photomultiplier tube. The face of the filter 32 is coated with an antireflection coating to further reduce flare.

To insure uniformity of collection across the scan line, the light receiving faces of the PMT's are arranged to be slightly displaced from the focal line 26. This has the effect of placing the scan line slightly out of focus on the faces of the detectors, thereby blurring the divisions between the detectors and insuring uniformity of response across the scan line.

Figure 3:
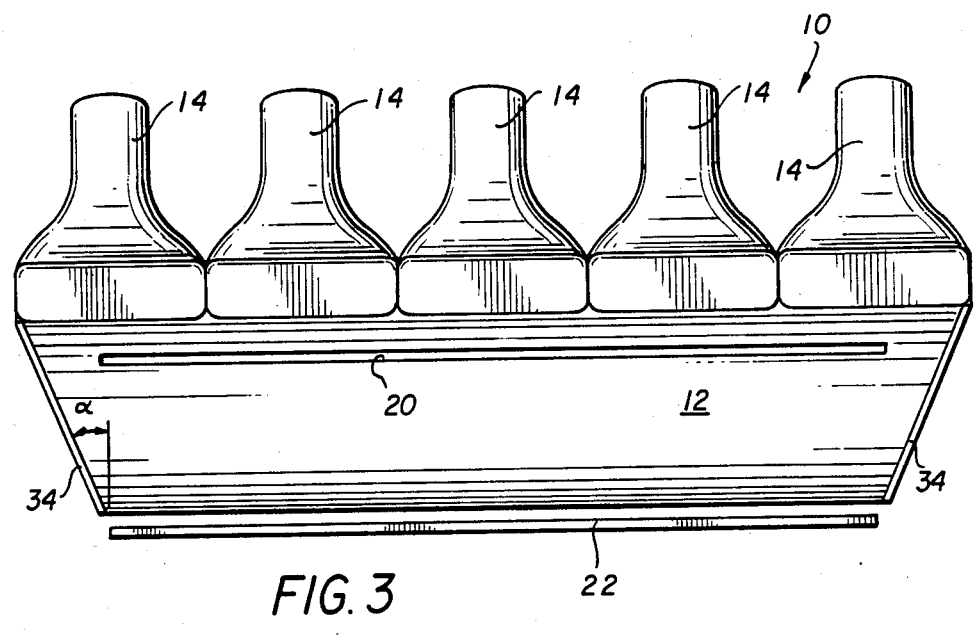
FIG. 3 is a front view of the light collector shown in FIG. 1.

FIG. 3 shows a front view of the light collector 10. As shown in FIG. 3, the end of the mirror box are closed with plane mirrors 34 that diverge by an angle $\gamma$ of 15° from the vertical so that the top of the mirror box near the photomultiplier tubes 14 is wider than the bottom near the phosphor sheet 22. This aids in the collection of emitted light that is emitted at low angles along the cylinder axis.

An elliptical cylinder light collector was designed having a length of 43 cm, a height of 10.5 cm, and a width of 5.0 cm. Five photomultiplier tubes having rectangular light receiving faces of 8.8 cm by 4 cm were employed as the light detectors. The slot 20 for passing the scanning beam through the mirror box, and the slot 30 in mask 28 were both 0.25 cm wide. The mirror box was placed away from the surface of the phosphor sheet 22 by 0.05 cm. The mirror surfaces were 92% specularly reflective single-point diamond machined aluminum plates.

Figure 4:
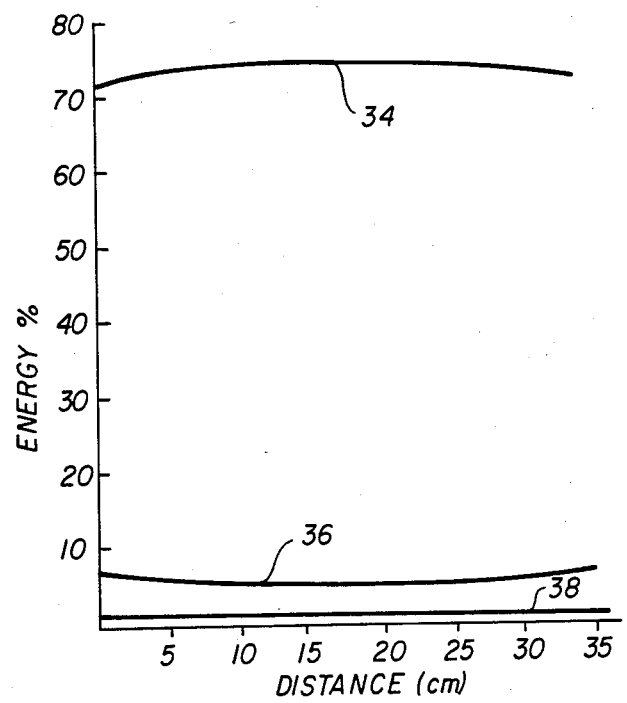
FIG. 4 is a graph showing the collection efficiency and flare across a scan line in the light collector of FIG. 1.

The performance of the light collector is shown in FIG. 4. The light detection efficiency as a percentage of the total energy of emitted light is shown by the line labeled 34 in FIG. 4. The collection efficiency is substantially uniform across a scan line, but slightly lower near the ends of the lines. The slight detection nonuniformity results from the difference in surface absorption between twice reflected and once reflected rays as the beam scans across the phosphor sheet. The line labeled 36 shows the percent of energy that is abosrbed across the scan line. The light rays emitted by the phosphor near the ends of the scan line are likely to hit the end mirror 34 and then the elliptical reflector 12 before reaching the light receiving face of the detector. Rays emitted by the phosphor sheet near the middle portion of the scan line are more likely to reach the detector directly or via a single reflection from the elliptical mirror. The slight nonuniformity and detection efficiency is easily compensated for by adjusting the relative gains of the corresponding photomultiplier tubes.

The line labeled 38 shows the relatively low percentage of flare experienced for this light collector.

INDUSTRIAL APPLICABILITY AND ADVANTAGES

The light collector of the present invention is useful in stimulable phosphor x-ray imaging apparatus for medical and industrial applications. The collector is advantageous in having uniform collection efficiency across a scan line, and low flare.

I claim

1. A light collector for collecting and detecting light emitted from a raster scanned photostimulable phosphor sheet, comprising:

a cylindrical mirror box having specularly reflective internal surfaces, said mirror box defining a first opening for passing a beam of stimulating radiation through said mirror box, a second opening for passing the beam to the phosphor sheet and for allowing emitted light to enter the mirror box, and a third opening generally opposite the second opening for allowing emitted light to exit the mirror box; and light detector means having a light receiving face located at said third opening, said cylindrical mirror box having a truncated elliptical cross section, said second and third openings truncating said elliptical cross section and being defined by first and second planes parallel to the cylinder axis and lying at 70° and 76° respectively to the major elliptical axis, and passing in the vicinity of first and second focal lines of the ellipse such that light emitted from the phosphor sheet in the vicinity of first focal line impinges on said light receiving face of said detector means in the vicinity of said second focal line after experiencing a single reflection.

2. The light collector claimed in claim 1, wherein the ends of said cylindrical mirror box are covered with plane mirrors.

3. The light collector claimed in claim 2, wherein said plane mirrors are arranged at an angle of 15° with respect to the vertical such that said third opening is wider than said second opening.

4. The light collector claimed in claim 1, further including an optical filter for absorbing stimulating radiation, and transmitting emitted radiation located between said third opening and said light receiving face of said light detector means.

5. The light collector claimed in claim 1, further including an antireflective coating on said optical filter.

6. The light collector claimed in claim 1, wherein said light detector means comprises a row of photomultiplier tubes having rectangular light receiving faces.

7. The light collector claimed in claim 1, further comprising a mask located over said second opening, said mask defining a slit extending parallel with and in the vicinity of said first focal line.

* * * * *